Sept. 15, 1936.   E. J. REH   2,054,166
METHOD OF MAKING LENSES
Filed Feb. 24, 1934
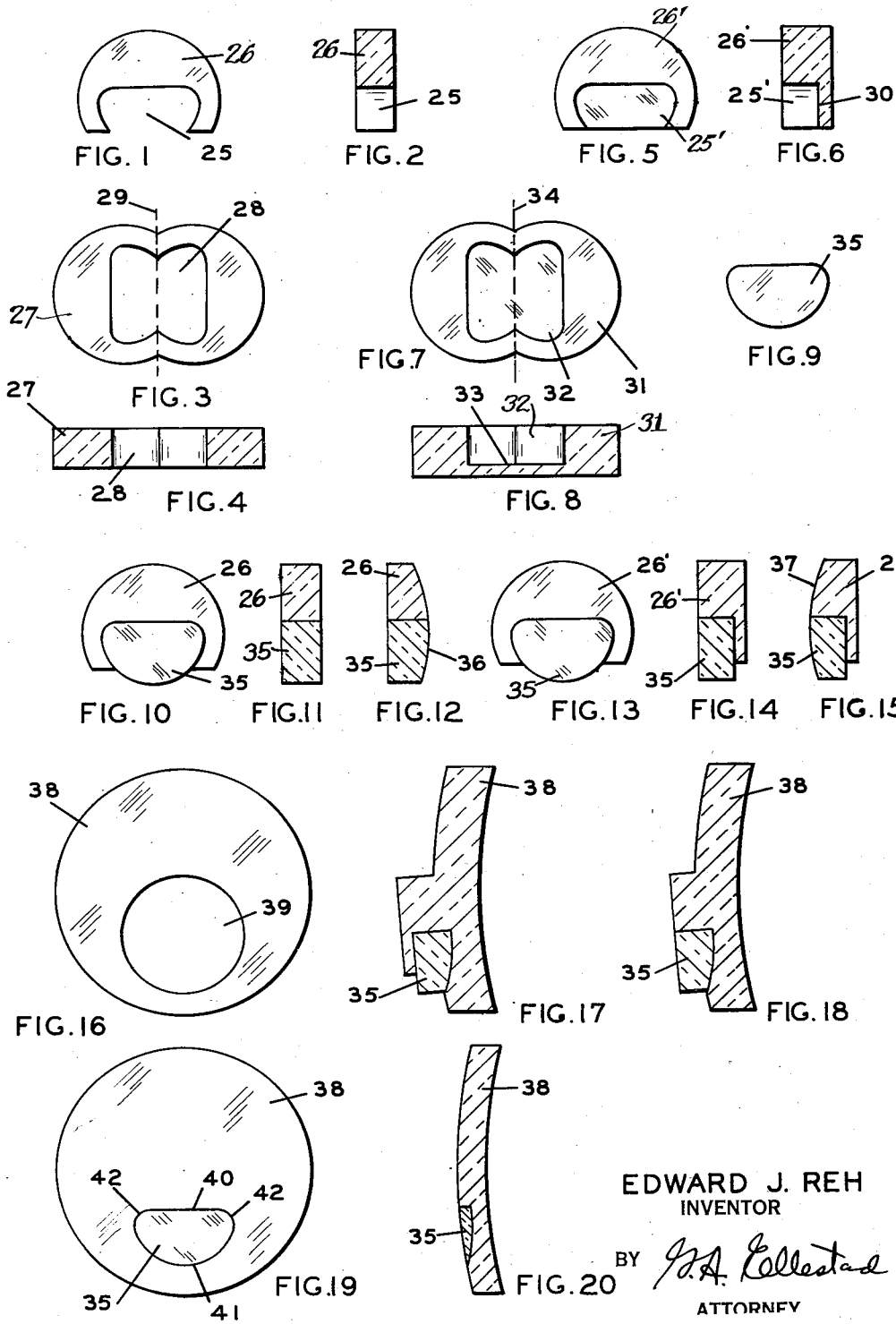
EDWARD J. REH
INVENTOR
BY J. A. Ollestad
ATTORNEY Patented Sept. 15, 1936

2,054,166

UNITED STATES PATENT OFFICE 2,054,166

METHOD OF MAKING LENSES

Edward J. Reh, Rochester, N. Y., assignor to Bausch & Lomb Optical Company, Rochester, N. Y., a corporation of New York Application February 24, 1934, Serial No. 712,763

3 Claims. (Cl. 88—54)

This invention relates to fused multifocal lenses and more particularly it has reference to methods and blanks relating to the manufacture of such lenses.

One of the objects of my invention is to provide an improved method of making fused multifocal lenses. Another object is to provide improved blanks and parts for making fused multifocal lenses. A still further object is to provide improved methods for making such blanks and parts. These and other objects and advantages reside in certain novel features of construction, arrangement and combination of parts and in the methods of constructing, arranging and combining same, all as will hereinafter be more fully described and pointed out in the appended claims.

Referring to the drawing:

Fig. 1 is a face view of my improved carrier button for use in making multifocal lenses.

Fig. 2 is a vertical section thereof.

Fig. 3 is a face view of a blank for use in making the carrier button.

Fig. 4 is a sectional view of same.

Fig. 5 is a face view of a modified form of carrier button.

Fig. 6 is a sectional view of same.

Fig. 7 is a face view of a blank for use in making the carrier button of Fig. 5.

Fig. 8 is a sectional view of same.

Fig. 9 is a face view of a segment of glass to be fused in the carrier button.

Fig. 10 is a view of the segment fused in the carrier button of Fig. 1.

Fig. 11 is a vertical section of same.

Fig. 12 is a similar view after the composite button has been surfaced on one side.

Fig. 13 is a view of the segment fused in the carrier button of Fig. 5.

Fig. 14 is a vertical section of same.

Fig. 15 is a similar view after the composite button has been surfaced on one side.

Fig. 16 is a face view of a major lens blank having a countersink.

Fig. 17 is a sectional view of same with the composite button of Fig. 15 fused in the countersink.

Fig. 18 is a similar view with the composite button of Fig. 12 fused in the countersink.

Fig. 19 is a face view of the finished lens.

Fig. 20 is a vertical section of same.

In making certain types of fused multifocal lenses, a segment of glass is fused into a carrier button of glass of different refractive index to provide a composite button. One surface of the composite button is ground and polished and the button is then fused into a polished countersink in a major blank of glass having substantially the same refractive index as the carrier button. I have shown my invention as applied to the manufacture of a fused multifocal lens having a reading segment which has a substantially straight top boundary and a lower circular boundary with the top boundary connected at its two ends to the circular boundary by curved lines which are preferably arcs of circles. In making such a lens, a carrier button is provided by forming a re-entrant portion 25 in a disk of glass 26 with the portion 25 extending from top to bottom of the disk as shown in Figs. 1 and 2. This button may be formed in any suitable manner as by pressing or molding the disk 26 with the portion 25 formed therein or by grinding the portion 25 into a disk of glass. In order to facilitate and cheapen the manufacture of such carrier buttons I may form the blank 27 with a socket or hole 28 therein. This blank 27 may then be severed along dotted line 29 to provide two carrier buttons of the type shown in Figs. 1 and 2.

Instead of providing the carrier button with a re-entrant portion which extends all the way through the glass disk from top to bottom, the portion 25' may be formed in the edge of disk 26' as a depression having a bottom 30 as shown in Figs. 5 and 6. Similarly, such a type of carrier button can be made advantageously by forming a blank 31, as by molding, for example, such as shown in Figs. 7 and 8. This blank has a depression 32 having a bottom 33. The blank is severed along the dotted line 34 at the narrow neck portion of the depression to provide two carrier buttons of the type shown in Figs. 5 and 6.

A segment of glass 35 of higher refractive index than the carrier buttons 26 and 26' is then shaped as shown in Fig. 9 to fit snugly into the portions 25 or 25'. The segment 35 and carrier button 26 are then fused together, as shown in Figs. 10 and 11, by methods well known in the art, after which the surface 36 is ground and polished to provide the composite disk or button shown in Fig. 12. Similarly, a segment 35 may be fused in carrier button 26' to provide the composite button of Figs. 13 and 14 and the surface 37 is ground and polished as shown in Fig. 15.

A major blank of glass 38 having a refractive index substantially the same as carrier buttons 26 and 26' is provided on one face with a ground and polished countersink 39. The composite disk of Fig. 15 is then fused in the countersink 39 to provide a blank shown in Fig. 18. Similarly, the composite disk or button of Fig. 12 may be fused in countersink 39 to provide the blank of Fig. 17. In either case, the lens is then finished by grinding and polishing the blank so as to provide a continuous surface over the major blank and embedded segment. Since the glass of the major blank and carrier button are of substantially the same properties, they merge into a single piece under fusion so that the finished lens appears as in Figs. 19 and 20.

From the foregoing, it will be apparent that I am able to attain the objects of my invention and provide an improved method of making fused multifocal lenses as well as improved blanks and parts for such lenses and methods of making such blanks and parts. Either type of carrier button can be readily and cheaply made. Due to the re-entrant portion on the edge of the disk the segment 35 is held in place during the fusing operation so that it cannot become dislodged or separated from the part to which it is to be fused. This eliminates the need of special fixtures for holding the two pieces together as is often necessary in edge fusing. By providing carrier buttons having re-entrant portions of the type shown I am able to provide a reading segment of the shape shown in Figs. 19 and 20 while still using a minimum quantity of glass. The segment 35 of the finished lens, as shown in Fig. 19, is bounded on the top by a substantially straight line 40 and on the bottom by a circular line 41 with the top and bottom lines connected by the two curved lines 42. Such a reading segment provides an ample reading field and affords maximum comfort and convenience to the user. The top boundary line 40 may, if desired, have a slight down curve instead of being a straight line. The vertical and horizontal dimensions and the exact shape of the re-entrant portions 25 and 25' may be altered as desired and the optical centers of the reading and distance portions may be located so as to give the desired optical performance. Various modifications can obviously be made without departing from the spirit of my invention.

I claim:

1. A method of making ophthalmic lenses which comprises forming a recess having a narrow neck portion on the edge of a disk of glass, inserting in said recess a segment of glass which substantially fills said recess and projects outwardly from the edge of the disk, subjecting said disk and segment to a fusing temperature, grinding and polishing one face of the fused disk and fusing said disk and segment onto a major blank of glass.

2. A method of making carrier buttons for fused multifocal lenses which comprises forming in a piece of glass an internal socket having two similar portions connected by a narrow neck portion and severing said piece of glass substantially across said neck portion.

3. A method of making ophthalmic lenses which comprises forming a recess having a reduced neck portion in the edge of a disk of glass, fusing in said recess a segment of glass having a different refractive index, forming a spherical surface on one side of the fused disk and segment, fusing said disk and segment onto a major lens blank having a polished countersink with said spherical surface in contact with the countersink and with the recess adjacent the periphery of the major blank and forming a continuous spherical surface across the fused disk, segment and major blank.

EDWARD J. REH.